April 8, 1958 G. D. BROWN 2,829,578
PLANTING DEPTH EQUALIZER
Filed Aug. 16, 1955
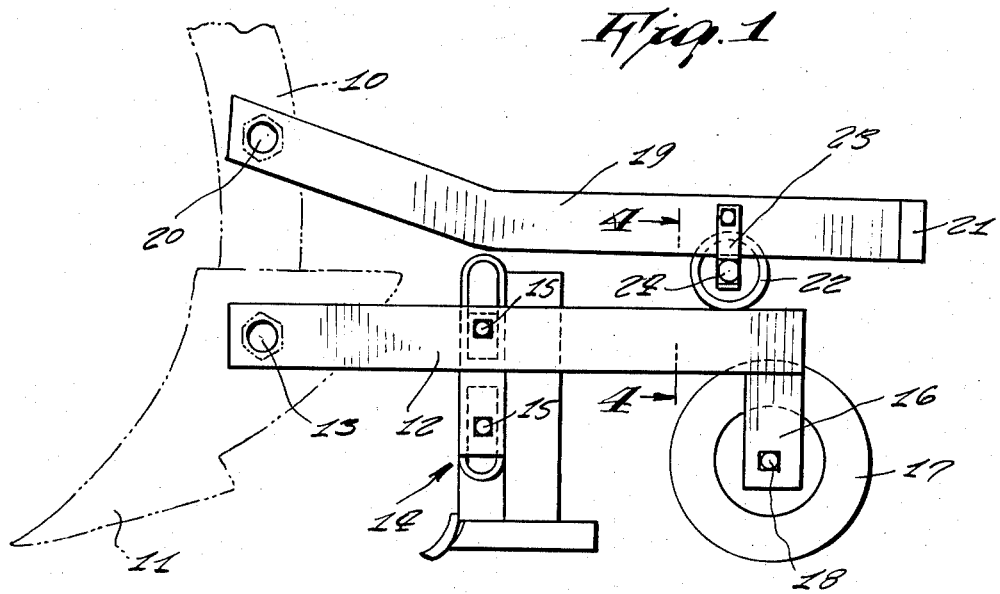
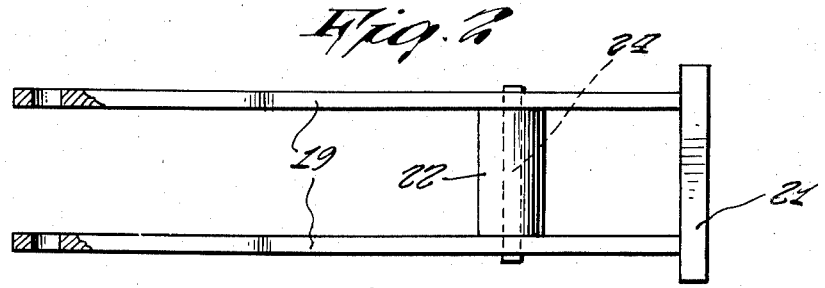
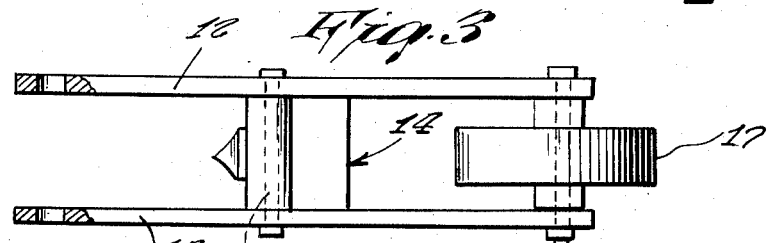
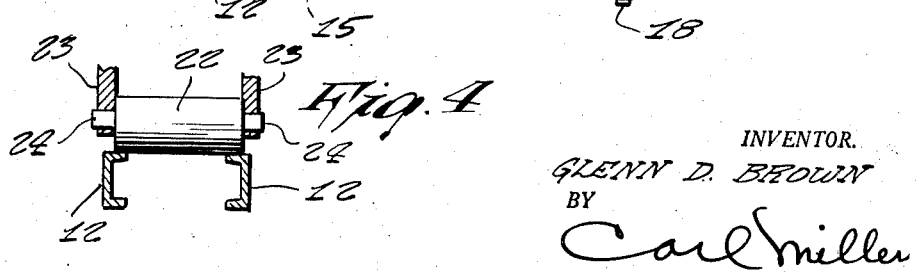
INVENTOR.
GLENN D. BROWN
BY
Carl Miller
ATTORNEY

United States Patent Office 2,829,578
Patented Apr. 8, 1958

2,829,578

PLANTING DEPTH EQUALIZER

Glenn D. Brown, Sayre, Okla.

Application August 16, 1955, Serial No. 528,590

2 Claims. (Cl. 97—56)

This invention relates to lister attachment.

It is an object of the present invention to provide an attachment for listers which will equalize the planting depth whereby to eliminate the usual adjustments of depth and covering of the seeds during planting, whereby to effect an economy of time.

It is another object of the present invention to provide a planting depth equalizer of the above type wherein as the planter is pulled over rough ground, the equalizer will still plant at the same depth.

Other objects of the invention are to provide a planting depth equalizer bearing the above objects in mind which is of simple construction, has a minimum number of parts, is inexpensive to manufacture and efficient in operation.

For other objects and a better understanding of the invention, reference may be had to the following detailed description taken in connection with the accompanying drawing, in which:

Figure 1 is a side elevation view of a conventional lister showing the invention in operative use thereon attached to the lister beam;

Fig. 2 is a top plan view of the invention;

Fig. 3 is a top plan view of one of the parts; and

Fig. 4 is a vertical sectional view taken along the line 4—4 of Fig. 1.

Referring now more in detail to the drawing, 10 indicates one of the shanks associated with the power lift mechanism of tractors and is provided with a bottom plow 11 of conventional construction. Behind the plow 11 a pair of arms 12 of U-shaped cross section (Fig. 4) are secured by a bolt 13. A sub-soiler indicated generally at 14 is mounted between the arms 12 by means of the pin 15. Depending plates 16 secured to the rear ends of the arms 12 rotatably mount therebetween the wheel 17 by means of the pin 18, the wheel 17 bearing on the soil after the seeds have been deposited by the seeder 14 in a manner well known to those skilled in the art.

In the practice of my invention, a pair of arms 19 are pivotally connected to the shank 10 at their forward ends by means of a nut and bolt assembly 20, the rear ends of the arms 19 being connected by the transverse bar 21. A roller 22 is rotatably mounted intermediate the arms 19 and therebelow by means of the depending brackets 23 and pin 24, the roller 22 resting on the upper edges of the arms 12. It will be noted that the roller 22 is wider than the distance between the arms 12 and will ride on the upper edges thereof at all times, exerting a constant pressure thereon to maintain the same depth in the ground. The purpose of the wheel 17 is to travel in the furrow made by the sub-soiler 14 and to press the loose dirt down, giving the seed and plants better footing when growing. By using the equalizer, one may omit using drags when planting.

It will be recognized that when the wheel 17 encounters a raised level of soil, such is operative to pivot the arms 12 about the bolt 13. The lifting of the outer extremity of the arms 12 is also operative to pivot the arms 19 of the equalizer about their pivot 20 which in turn causes the roller 22 to roll rearwardly along the arms 12, thereby providing an increased downward pressure on the wheel 17. Conversely, when the wheel 17 encounters a hollow, the roller 22 moves inwardly of the end of the arms 12, thereby decreasing the downward pressure on the wheel 17. Thus, additional pressure is automatically supplied to flatten higher levels of dirt, and the pressure is decreased when the immediate ground level is low, the pressure in all cases being furnished by the inherent weight of the roller 22 and its support frame.

While various changes may be made in the detail construction, it shall be understood that such changes shall be within the spirit and scope of the present invention as defined by the appended claims.

Having thus set forth and disclosed the nature of my invention, what is claimed is:

1. A planting depth equalizer comprising a pair of sub-soiler mounting arms adapted to be pivotally secured at one end to a plow and having a ground engaging wheel rotatably carried at the opposite rearward ends thereof, a second pair of arms adapted to be pivotally secured at one end to a plow above the level of said pivoted engagement of said mounting arms and having a roller rotatably carried at the opposite rearward ends thereof above said opposite ends of said mounting arms and in bearing engagement therewith, said roller being wider than the distance between the upper edges of said mounting arms; and means for connecting said opposite ends of said second pair of arms comprising a transverse plate secured thereto rearwardly of said roller.

2. A planting depth equalizer according to claim 1, wherein said wheel is rotatably mounted between and below the rear ends of the sub-soiler mounting arms whereby to tamp the dirt over the seeds in the furrow after they have been planted, said wheel being mounted below said roller.

References Cited in the file of this patent

UNITED STATES PATENTS

| 58,277 | Metz et al. | Sept. 25, 1866 |
| 875,407 | Bingaman | Dec. 31, 1907 |
| 1,424,669 | Neely | Aug. 1, 1922 |
| 1,901,299 | Johnson | Mar. 14, 1933 |